(12) United States Patent
Henderson et al.

(10) Patent No.: US 12,259,498 B2
(45) Date of Patent: Mar. 25, 2025

(54) DRAM-BASED LIDAR PIXEL

(71) Applicant: Sense Photonics, Inc., Durham, NC (US)

(72) Inventors: Robert Henderson, Edinburgh (GB); Hod Finkelstein, Berkeley, CA (US)

(73) Assignee: Sense Photonics, Inc., Durham, NC (US)

( * ) Notice: Subject to any disclaimer, the term of this patent is extended or adjusted under 35 U.S.C. 154(b) by 1100 days.

(21) Appl. No.: 17/155,871

(22) Filed: Jan. 22, 2021

(65) Prior Publication Data

US 2021/0231782 A1    Jul. 29, 2021

Related U.S. Application Data

(60) Provisional application No. 62/966,171, filed on Jan. 27, 2020.

(51) Int. Cl.
*G01C 3/08* (2006.01)
*G01S 7/481* (2006.01)
(Continued)

(52) U.S. Cl.
CPC .......... *G01S 7/4861* (2013.01); *G01S 7/4817* (2013.01); *G01S 7/484* (2013.01); *G01S 7/4915* (2013.01); *G01S 17/931* (2020.01)

(58) Field of Classification Search
CPC ...... G01S 7/4861; G01S 7/4817; G01S 7/484; G01S 7/4915; G01S 17/931
See application file for complete search history.

(56) References Cited

U.S. PATENT DOCUMENTS

| 4,891,772 A | * | 1/1990 | Case | ........................ | G01S 17/46 |
| | | | | | 250/201.4 |
| 5,298,905 A | | 3/1994 | Dahl | | |

(Continued)

FOREIGN PATENT DOCUMENTS

| CN | 105629925 A | 6/2016 |
| CN | 105684087 A | 6/2016 |

(Continued)

OTHER PUBLICATIONS

EP21747770.2, "Extended European Search Report", Dec. 21, 2023, 9 pages.

(Continued)

*Primary Examiner* — Mark Hellner
(74) *Attorney, Agent, or Firm* — Kilpatrick Townsend & Stockton LLP

(57) ABSTRACT

A Light Detection and Ranging (LIDAR) detector circuit includes a memory device comprising a non-transitory storage medium that is configured to store data indicative of detection events in respective memory bins, and at least one control circuit. The at least one control circuit is configured to receive detection signals from one or more photodetector elements, identify a presence or an absence of detection events indicated by the detection signals during a portion of time between pulses of an emitter signal output from a LIDAR emitter element, and execute one of a first memory operation or a second memory operation to update the data in the respective memory bins responsive to identification of the presence or the absence of the detection events, respectively. Related circuits and methods of operation are also discussed.

26 Claims, 11 Drawing Sheets

(51) Int. Cl.
  *G01S 7/484* (2006.01)
  *G01S 7/4861* (2020.01)
  *G01S 7/4915* (2020.01)
  *G01S 17/931* (2020.01)

(56) References Cited

U.S. PATENT DOCUMENTS

| | | | |
|---|---|---|---|
| 9,019,785 | B2 | 4/2015 | Cowles et al. |
| 9,437,256 | B2 | 9/2016 | Cowles et al. |
| 9,891,142 | B2 | 2/2018 | Nair |
| 2004/0119838 | A1 | 6/2004 | Griffis et al. |
| 2007/0008808 | A1 | 1/2007 | Schnieder |
| 2016/0216376 | A1 | 7/2016 | Patil |
| 2018/0164415 | A1* | 6/2018 | Buckley .................. G01S 17/18 |
| 2018/0301872 | A1 | 10/2018 | Burroughs et al. |
| 2019/0250257 | A1 | 8/2019 | Finkelstein et al. |
| 2020/0135776 | A1 | 4/2020 | Finkelstein |
| 2020/0256963 | A1* | 8/2020 | Onal ..................... H01L 31/107 |

FOREIGN PATENT DOCUMENTS

| | | | | |
|---|---|---|---|---|
| CN | 110235024 | A | * 4/2019 | ........... G01S 17/894 |
| JP | 2010281694 | A | 12/2010 | |
| JP | 2015155872 | A | * 2/2014 | ............. G01S 17/10 |

OTHER PUBLICATIONS

Notification of Transmittal of the International Search Report and the Written Opinion of the International Searching Authority, or the Declaration, in corresponding PCT Application No. PCT/US2021/014570 (May 11, 2021).

CN202180024308.8, "Office Action", Sep. 15, 2024, 15 pages.

* cited by examiner

DRAM-BASED LIDAR PIXEL

CLAIM OF PRIORITY

This application claims priority from United States Provisional Patent Application No. 62/966,171, entitled "DRAM-Based LIDAR Pixel," filed Jan. 27, 2020, in the United States Patent and Trademark Office, the entire contents of which are incorporated by reference herein.

FIELD

The present disclosure is directed to Light Detection and Ranging (LIDAR: also referred to as lidar) systems, and more particularly, to memory operations in time-of-flight lidar systems.

BACKGROUND

Time of flight (ToF) based imaging is used in a number of applications including range finding, depth profiling, and 3D imaging (e.g., lidar). Direct time of flight measurement includes directly measuring the length of time between emitting radiation and sensing the radiation after reflection from an object or other target. From this, the distance to the target can be determined. Indirect time of flight measurement includes determining the distance to the target by phase modulating the amplitude of the signals emitted by emitter element(s) of the lidar system and measuring phases (e.g., with respect to delay or shift) of the echo signals received at detector element(s) of the lidar system. These phases may be measured with a series of separate measurements or samples.

In specific applications, the sensing of the reflected radiation in either direct or indirect time of flight systems may be performed using an array of photodetectors, such as an array of Single Photon Avalanche Diodes (SPADs). One or more photodetectors may define a detector pixel of the array. SPAD arrays may be used as solid-state detectors in imaging applications where high sensitivity and timing resolution may be required.

A SPAD is based on a semiconductor junction (e.g., a p-n junction) that may detect incident photons when biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively (e.g., by reducing the bias voltage) or passively (e.g., by using the voltage drop across a serially connected resistor), to allow the device to be "reset" to detect further photons. The initiating charge carrier can be photo-electrically generated by a single incident photon striking the high field region. It is this feature which gives rise to the name 'Single Photon Avalanche Diode'. This single photon detection mode of operation is often referred to as 'Geiger Mode'.

When imaging a scene, ToF sensors for LiDAR applications can include circuits that time stamp and/or count incident photons as reflected from a target. Some ToF pixel approaches may use digital or analog circuits to count the detection of photons and the arrival times of photons, also referred to as time-stamping.

Data rates can be compressed by histogramming timestamps: however, this can involve considerable memory resources which may be inefficiently used in typical ToF LIDAR systems. For example, the memory depth (e.g., the number of bits) of each histogram bin (which may correspond to a respective subrange of photon arrival times) is typically set by the peak or maximum expected laser returns, whereas, in practice, many or most histogram bins will be sparsely occupied (e.g., only by background noise). In addition, thousands of time bins (each corresponding to respective photon arrival times) may typically be used to form a histogram sufficient to cover the typical time range of a LIDAR system (e.g., microseconds) with the typical time-to-digital converter (TDC) resolution (e.g., 50-100 ps).

A memory device, such as Static Random Access Memory (SRAM), may be used for memory storage. SRAM is typically over twenty times more compact per bit than some counters that may be conventionally applied to SPAD pixels. A single bit in a counter is represented by a D-type (or T-type) flip-flop with around 32 transistors in standard cell libraries. In addition a readout cell (e.g., a tristate buffer) may be used per bit. SRAM may involve challenges, however, in that the read-increment-write logic conventionally incorporated in some SRAM configurations may be large and difficult to incorporate in smaller pixel due to layout/space limitations, particularly as speed and storage requirements increase.

SUMMARY

Some embodiments described herein provide a lidar system including one or more emitter units (including one or more semiconductor lasers, such as surface- or edge-emitting laser diodes: generally referred to herein as emitters, which output emitter signals), one or more light detector pixels (including one or more photodetectors, such as semiconductor photodiodes, including avalanche photodiodes and single-photon avalanche detectors; generally referred to herein as detectors, which output detection signals in response to incident light), and one or more control circuits that are configured to selectively operate subsets of the emitter units and/or detector pixels (including respective emitters and/or detectors thereof, respectively) to provide a 3D time of flight (ToF) flash lidar system.

In some embodiments, the one or more control circuits are configured to execute one of a first or second memory operation responsive to detection signals indicating a presence or an absence of the detection events, respectively, to update the data stored in respective memory bins during a portion of time between pulses of an emitter signal output from a LIDAR emitter element.

According to some embodiments of the present disclosure, a LIDAR detector circuit includes a memory device comprising a non-transitory storage medium that is configured to store data in respective memory bins, and at least one control circuit. The at least one control circuit is configured to receive detection signals from one or more photodetector elements; identify a presence or an absence of detection events indicated by the detection signals during a portion of time between pulses of an emitter signal output from a LIDAR emitter element; execute a first memory operation to update the data in the respective memory bins responsive to the detection signals indicating a presence of the detection events during the portion of the time between the pulses of the emitter signal; and execute a second memory operation to update the data in the respective memory bins responsive to the detection signals indicating an absence of the detection events during the portion of the time between the pulses of the emitter signal.

In some embodiments, the first memory operation may be an increment operation, and the second memory operation comprises a refresh operation.

In some embodiments, the at least one control circuit may be configured to execute the refresh operation at a frequency that is greater than or less than a frequency of the pulses of the emitter signal.

In some embodiments, the frequency of the refresh operation may be temperature-dependent.

In some embodiments, the at least one control circuit may include a logic-based counter circuit that is configured to perform the increment operation or the refresh operation.

In some embodiments, the counter circuit may include a plurality of serially-connected adder circuits.

In some embodiments, the counter circuit may include a linear feedback shift register that is configured to execute the increment operation by shifting bits stored in the respective memory bins forward using a linear feedback loop.

In some embodiments, the linear feedback shift register may be configured to execute the refresh operation by feeding bits stored in the respective memory bins back to at least one input thereof.

In some embodiments, the increment operation or the refresh operation to update the data stored in the respective memory bins of the memory device may be completed within the time between the pulses of the emitter signal.

In some embodiments, the increment or refresh operations may be performed sequentially for the respective memory bins.

In some embodiments, the memory device may be a memory array comprising respective rows or columns of dynamic random access memory (DRAM) cells that define the respective memory bins, and at least one control circuit may be further configured to output a readout signal responsive to a read signal that is sequentially applied to the respective rows or columns.

In some embodiments, the memory device and the one or more photodetector elements may include the DRAM cells and a plurality of the photodetector elements that are native to a same wafer.

In some embodiments, the memory device and the one or more photodetector elements may include the DRAM cells and a plurality of the photodetector elements that are provided on respective wafers and electrically interconnected.

In some embodiments, the DRAM cells may be provided in respective trenches between the photodetector elements and may define optical and/or electrical barriers between adjacent ones of the photodetector elements.

In some embodiments, the readout signal may include a count signal and/or a time integration signal, and the at least one control circuit may be configured to calculate an estimated time of arrival of photons incident on the photodetector elements based on the readout signal.

In some embodiments, the portion of the time between the pulses of the emitter signal may correspond to a respective distance subrange, and wherein the respective memory bins comprise histogram data corresponding to the respective distance subrange.

In some embodiments, the photodetector elements may include single-photon avalanche detectors (SPADs), and the histogram data may include photon counts indicated by the detection signals corresponding to the respective distance subrange.

In some embodiments, the at least one control circuit may be configured to transmit respective strobe signals that activate the one or more photodetector elements for respective detection windows that are differently delayed between the pulses of the emitter signal.

In some embodiments, the respective detection windows may correspond to respective distance subranges, and wherein the at least one control circuit is configured to transmit the respective strobe signals to activate the one or more photodetector elements to sequentially cycle through the respective distance subranges.

According to some embodiments of the present disclosure, a LIDAR detector circuit includes one or more photodetector elements defining a LIDAR detector pixel, a memory device comprising a non-transitory storage medium that is configured to store data in respective memory bins, and at least one processor circuit. The at least one processor circuit is configured to receive detection signals from the one or more photodetector elements, identify an absence of detection events indicated by the detection signals during a portion of time between pulses of an emitter signal output from a LIDAR emitter element, and execute a memory operation to update the data in the respective memory bins responsive to identification of the absence of the detection events.

In some embodiments, the memory operation may be a refresh operation. The at least one processor circuit may be further configured to identify a presence of the detection events indicated by the detection signals during the portion of the time between the pulses of the emitter signal, and execute an increment operation to update the data in the respective memory bins responsive to identification of the presence of the detection events.

In some embodiments, the at least one processor circuit may be configured to execute the refresh operation at a frequency that is greater than or less than a frequency of the pulses of the emitter signal. For example, the frequency of the refresh operation may be temperature-dependent.

In some embodiments, the at least one processor circuit may include a linear feedback shift register that is configured to execute the increment operation by shifting bits stored in the respective memory bins forward using a linear feedback loop, and is configured to execute the refresh operation by feeding bits stored in the respective memory bins back to at least one input thereof.

In some embodiments, the increment operation or the refresh operation to update the data stored in the respective memory bins of the memory device may be completed within the time between the pulses of the emitter signal.

In some embodiments, the portion of the time between the pulses of the emitter signal may correspond to a respective distance subrange, and the respective memory bins may include histogram data corresponding to the respective distance subrange. The histogram data may include photon counts indicated by the detection signals.

In some embodiments, the memory device may include dynamic random access memory (DRAM) cells that define the respective memory bins.

According to some embodiments of the present disclosure, a method of operating a LIDAR detector circuit includes receiving detection signals from one or more photodetector elements: identifying a presence or an absence of detection events indicated by the detection signals during a portion of time between pulses of an emitter signal output from a LIDAR emitter element; and executing one of a first memory operation or a second memory operation to update data stored in respective memory bins of a memory device responsive to identification of the presence or the absence of the detection events, respectively, where the memory device is a non-transitory storage medium.

In some embodiments, the first memory operation may be an increment operation, and the second memory operation may be a refresh operation.

In some embodiments, the executing the refresh operation may include executing the refresh operation at a frequency that is greater than or less than a frequency of the pulses of the emitter signal.

In some embodiments, the executing the increment operation may include shifting bits stored in the respective memory bins forward using a linear feedback loop of a linear feedback shift register.

In some embodiments, the executing the refresh operation may include feeding bits stored in the respective memory bins back to at least one input of the linear feedback shift register.

In some embodiments, the executing the one of the increment operation or the refresh operation to update the data stored in the respective memory bins of the memory device may be completed within the time between the pulses of the emitter signal.

According to some embodiments of the present disclosure, a LIDAR system may include a detector circuit as described in any of the embodiments herein. The LIDAR system is configured to be coupled to an autonomous vehicle such that the LIDAR emitter element and the one or more photodetector elements are oriented relative to an intended direction of travel of the autonomous vehicle.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1:
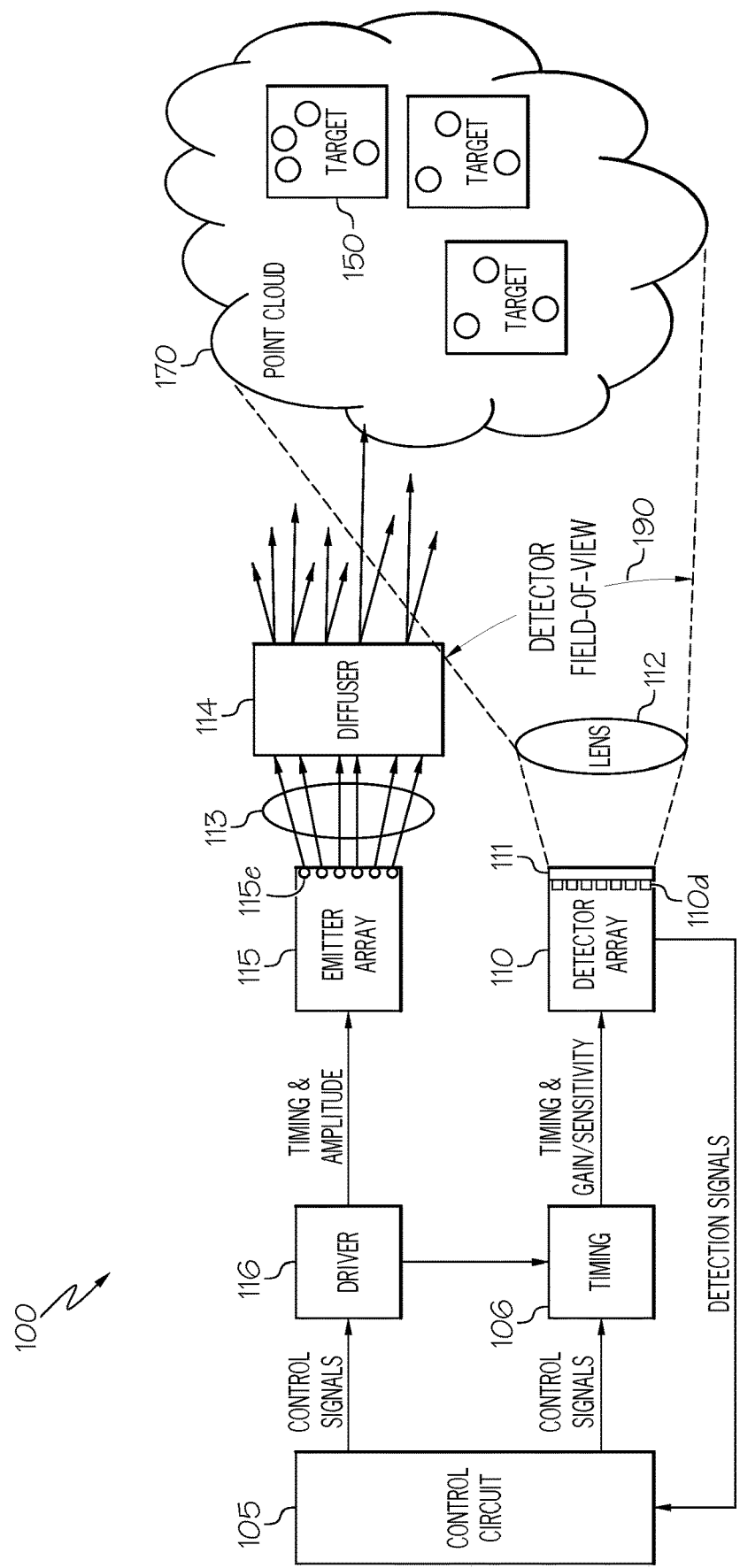
FIG. 1 is a schematic block diagram illustrating an example of a LIDAR system or circuit in accordance with embodiments of the present disclosure.

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A detector pixel may also include or provide outputs to dedicated circuits, such as storage and logic circuits (including correlator, counter, and/or time integrator logic), which are not shared with other pixels, referred to herein as an "in-pixel" configuration. A flash lidar system may acquire images by emitting light from an array of emitters, or a subset of the array, for short durations (pulses) over a field of view (FoV) or scene, and detecting the echo signals reflected from one or more targets in the FoV at one or more detectors. A non-flash or scanning lidar system may generate image frames by scanning light emission (e.g., continuously) over a field of view or scene, for example, using a point scan or line scan to emit the necessary power per point and sequentially scan to reconstruct the full FoV.

In embodiments described herein, a detection window or strobe window may refer to the respective durations of activation and deactivation of one or more detectors (e.g., responsive to respective detector time gates/control signals from a control circuit) over a temporal period or time between pulses of the signal output by the emitter(s) (which may likewise be responsive to respective emitter control signals from a control circuit). The relative timings and durations of the respective detection windows may be controlled by respective strobe signals (Strobe<x>) as described herein, in which case the detection windows may be referred to as strobe windows.

Some conventional SRAM-based detector pixel implementations may include six transistors per SRAM cell (e.g., NMOS and PMOS: also referred to as 6T), where each bit may be stored on four transistors that form two cross-coupled inverters (providing two stable states which are used to denote logic 0 and logic 1), with two additional access transistors (to control the access to a storage cell during read and write operations). Such configurations can impose limitations on surface area-per-bit and power-per-bit. For example, in histogramming memory applications, such limitations can include (but are not limited to) the number of detector pixels, the bit depth of the histogram bins (also referred to herein as memory bins), and the number of histogram bins. In particular, including more transistors per memory cell or pixel may cause peak power requirements to increase with the number of detector pixels (e.g., for arrays with a large number of detector pixels in the presence of high background light levels or signals reflected from retroreflectors), which can cause data integrity issues. Also, particularly if pixel area is limited (e.g., due to optics or cost consideration), the greater the number of transistors per memory cell or pixel may limit the bit depth of the histogram bins (which can result in saturation in the presence of retroreflectors) as well as the number of histogram bins (where, due to the numerous strobe windows of limited duration, photons may be unaccounted for or "lost" when the emitter is active outside of or between the strobe windows, thereby increasing emitter power requirements, which may cause surface area and emitter peak efficiency issues).

Also, some conventional SRAM-based detector pixel implementations may include limitations as to binary counting and arithmetic logic unit (ALU) cycle time. For example, some binary counters may use a k-bit carry chain, which may require k gate delays to settle if implemented with chained full-adders (e.g., whereby the carry output (Co) of one full adder is connected to the carry input (Ci) of the next full adder). However, such a configuration may make it difficult to settle within or inside about half of a bin time in some instances, which can thus impose limitations on the histogram bin time and associated depth resolution. Also, the logic required to precharge, read, modify, and write an SRAM-based detector pixel may be relatively complex and area-consuming, limiting available histogram bin area and therefore dynamic range and strobe window duration (as fewer strobe windows with longer durations can be used as memory capacity increases).

Some embodiments of the present disclosure may arise from realization that, in some lidar applications, memory may be accessed sequentially, e.g., by stepping progressively through and updating memory bins (which may indicate respective sub-ranges of photon arrival times) in real time with incoming photon counts returning from the laser pulse reflected from a target, responsive to continuously or periodically applying a control signal to an emitter unit and applying a strobe signal to a detector pixel to cycle through a series of distance sub-ranges. In contrast, in some conventional uses of SRAM, data states may typically be held for unpredictable time durations set by sporadic access by an external system, and the memory access may be random.

Accordingly, some embodiments of the present disclosure may provide detector pixels including memory array implementations and related control schemes that allow for greater memory densities (e.g., by utilizing fewer transistors) than may be possible with SRAM-based memory. For example, some embodiments of the present disclosure may provide memory devices (such as Dynamic Random Access Memory (DRAM)-based memory), using sequential memory access and memory refresh operations that are coordinated with the cycling through the series of distance sub-ranges performed by lidar detector pixels, as well as with the time between pulses of a lidar emitter signal. The use of DRAM may require fewer transistors per pixel (e.g., 1-3 transistors) of a same type (e.g., NMOS-only) as compared to SRAM implementations, with memory refresh operations performed that may be at a sufficient refresh rate (e.g., once per emitter signal cycle, once every two emitter signal cycles, etc.) to prevent leakage of the stored value in each DRAM cell, and may be completed within the time between pulses of a lidar emitter signal.

Some embodiments may include gain cell DRAM implementations, for example, a two-, three-, or four-transistor (2T/3T/4T) DRAM configuration (i.e., with 2/3/4 transistors per DRAM cell/storage bit), where the DRAM cells of each memory bin can be incremented in response to a detection event, or can be refreshed (e.g., periodically) in the absence of detection events during the time between pulses of the emitter signal. For example, for a 400 meter (m) imaging distance range, an emitter cycle may have a frequency of 375 kHz, with a period of about 2.667 us between pulses of the emitter signal. The maximum refresh time for a memory bin in this example may correspond to the 2.667 us emitter cycle, which may be sufficient to overcome bit leakage issues (e.g., at temperatures of about 125° C. or more). Alternatively, some embodiments may include a single transistor (1T1C) DRAM configuration (i.e., with one transistor and one capacitor per DRAM cell/storage bit) with related sense amplifier circuitry to increment or refresh the DRAM cells of each memory bin.

In some embodiments, memory bin increment or refresh operations may be performed using a logic-based counter circuit. For example, a series or chain of adders may be used to increment or refresh the values of the DRAM cells of each memory bin. As another example, linear-feedback shift register (LFSR)-based counting can be used to reduce or minimize memory bin update times (and hence improve time resolution), as well as to reduce or minimize precharge-read-modify-write (PRMW) logic overhead (and hence total number of DRAM bits and histogram area). While described primarily in the examples herein with reference to DRAM-based memory, it will be understood that embodiments of the present disclosure are not limited to DRAM, or any particular memory storage technology, and may be applied to memory devices other than those specifically described herein.

An example of a lidar system or circuit 100 that may utilize embodiments of the present disclosure is shown in FIG. 1. The lidar system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power and/or the repetition rate of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e.

The emission of optical signals from multiple emitters 115e provides a single image frame for the flash LIDAR system 100, but embodiments of the present disclosure may include non-flash or scanning LIDAR systems as well. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115e and/or provides different signals (e.g., strobe signals) to the timing circuitry 106 of different detectors 110d to enable/disable the different detectors 110d so as to detect the echo signal from the target 150. 'Strobing' as used herein may refer to the generation of detector control signals (also referred to herein as strobe signals or 'strobes') to control the timing and/or duration of activation (detection or strobe windows) of one or more detectors 110d of the lidar system 100. The control circuit 105 may also control memory storage operations for storing data indicated by the detection signals in a non-transitory memory or memory array 205.

Figure 2:
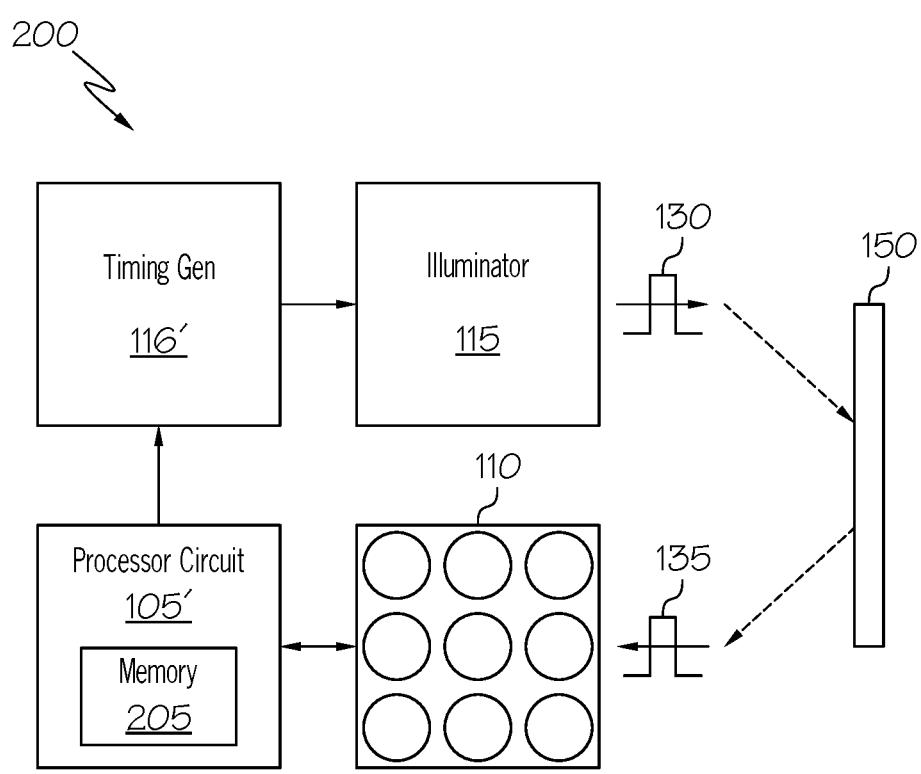
FIG. 2 is a schematic block diagram further illustrating components of a measurement system or circuit in a LIDAR application in accordance with some embodiments of the present disclosure.

FIG. 2 further illustrates components of a ToF measurement system or circuit 200 in a LIDAR application in accordance with some embodiments described herein. The circuit 200 may include a processor circuit 105' (such as a digital signal processor (DSP)), a timing generator 116' which controls timing of the illumination source (illustrated by way of example with reference to a laser emitter array 115), and an array of single-photon detectors (illustrated by way of example with reference to a single-photon detector array 110). The processor circuit 105' may also include a sequencer circuit that is configured to coordinate operation of the emitters 115e and detectors 110d.

The processor circuit 105' and the timing generator 116' may implement some of the operations of the control circuit 105 and the driver circuit 116 of FIG. 1. The laser emitter array 115 emits a laser pulse 130 at a time controlled by the timing generator 116'. Light 135 from the laser pulse 130 is reflected back from a target (illustrated by way of example as object 150), and is sensed by single-photon detector array 110. The processor circuit 105' implements a pixel processor that measures the ToF of the laser pulse 130 and its reflected signal 135 over the journey from emitter array 115 to object 150 and back to the single-photon detector array 110.

The processor circuit 105' may provide analog and/or digital implementations of logic circuits that provide the necessary timing signals (such as quenching and gating or strobe signals) to control operation of the single-photon detectors of the array 110 and process the detection signals output therefrom. For example, the single-photon detectors of the array 110 may generate detection signals in response to incident photons only during the short gating intervals or strobe windows that are defined by the strobe signals.

Photons that are incident outside the strobe windows have no effect on the outputs of the single photon detectors. More generally, the processor circuit 105' may include one or more circuits that are configured to generate the respective detector control signals that control the timing and/or durations of activation of the detectors 110d, and/or to generate respective emitter control signals that control the output of optical signals from the emitters 115e.

In some embodiments, during the activation or recharging of the detectors, the detection probabilities for a photon may vary over time. Thus, the detector may be activated just before the start of the strobe window but a sampling circuit may only process the detection signals output from the detector once the strobe window begins. Similarly, the detector may initiate its turn-off or forced discharge after the end of the strobe window but the processing circuit may disable input from the detector's output immediately upon the end of the strobe window. Thus, the detectors may be active for a longer duration than the strobe window but the processing circuit may only process their output during the strobe window, for example, responsive to a sampling cycle or clock cycle that is sufficiently short to allow multiple samples of a detector output to be collected during the strobe window (for example, sampling of the detection signals at a frequency corresponding to a number of memory bins).

Detection events may be identified by the processor circuit 105' based on one or more photon counts indicated by the detection signals output from the detector array 110, which may be stored in the memory 205. In some embodiments, the processor circuit 105' may include a correlation circuit or correlator that identifies detection events based on photon counts (referred to herein as correlated photon counts) from two or more detectors within a predefined window of time relative to one another, referred to herein as a correlation window or correlation time, where the detection signals indicate arrival times of incident photons within the correlation window. As photons corresponding to the optical signals output from the emitter array 115 (also referred to as signal photons) may arrive relatively close in time as compared to photons corresponding to ambient light (also referred to as background photons), the correlator is configured to distinguish signal photons based on respective times of arrival within the correlation time relative to one another. Such correlators are described, for example, in U.S. Patent Application Publication No. 2019/0250257 entitled "Methods and Systems for High-Resolution Long Range Flash Lidar," which is incorporated by reference herein.

The processor circuit 105' may be small enough to allow for three-dimensionally stacked implementations, e.g., with the detector array 110 "stacked" on top of the processor circuit 105' (and/or other related circuits, such as the memory 205) that is/are sized to fit within an area or footprint of the array 110. For example, some embodiments may implement the detector array 110 on a first substrate, and transistor arrays of the circuits 105/105' on a second substrate, with the first and second substrates/wafers bonded in a stacked arrangement, as described for example in U.S. Patent Application Publication No. 2020/0135776 entitled "High Quantum Efficiency Geiger-Mode Avalanche Diodes Including High Sensitivity Photon Mixing Structures and Arrays Thereof," filed Oct. 30, 2019, the disclosure of which is incorporated by reference herein.

The pixel processor implemented by the processor circuit 105' is configured to calculate an estimate of the average ToF aggregated over thousands of laser pulses 130 and photon returns in reflected light 135. The processor circuit 105' may be configured to count incident photons in the reflected light 135 to identify detection events (e.g., based on one or more SPADs 110 that have been triggered) over a laser cycle (or portion thereof). The timings and durations of the detection windows may be controlled by a strobe signal (Strobe #x or Strobe<x>) as described herein. Many repetitions of Strobe<x> are aggregated (e.g., in the pixel) to define a sub-frame for Strobe<x>, with subframes 1 to x defining an image frame. Each sub-frame may correspond to a respective distance sub-range of the overall imaging distance range, where the frequency of the laser cycle may be selected based on the desired imaging distance range.

Figure 3:
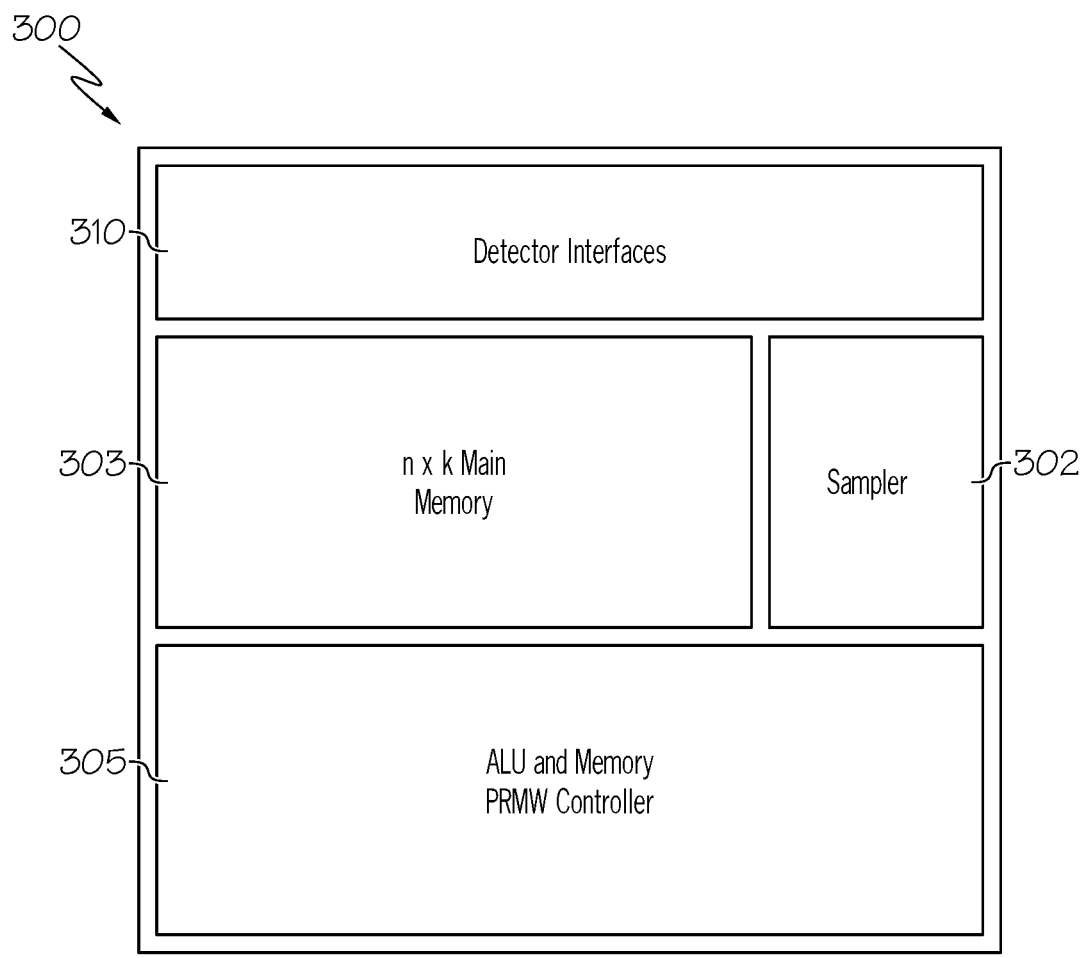
FIG. 3 is a schematic block diagram illustrating an example configuration of a memory circuit implementing a memory pixel in accordance with some embodiments of the present disclosure.

In some embodiments, a detector pixel may include circuits that implement a memory array (e.g., memory 205) and a memory controller (e.g., control circuit 105/processor 105') such as a DRAM controller, collectively referred to herein as a memory circuit. FIG. 3 illustrates an example configuration of a memory circuit implementing a memory pixel 300 (e.g., a DRAM-based pixel) in accordance with some embodiments of the present disclosure. In particular, the memory pixel 300 of FIG. 3 may represent a lower or bottom tier of a pixel layout, for example, on which an array of detector pixels 110 may be stacked to define a three-dimensionally stacked implementation. The memory pixel 300 of FIG. 3 may thus be sized to fit within the area or footprint of the detector array 110.

The memory pixel 300 of FIG. 3 includes a photodetector interface circuit 310 configured to receive detection signals from one or more photodetectors (e.g., SPADs), a sampler circuit 302 (illustrated as a sampler) configured to sample the detection signals output from the photodetectors, a main memory device 303 configured to store histogram data (illustrated as a n×k DRAM device, where n refers to the number of histogram bins and k refers to the bits per bin), and a controller circuit 305 (illustrated as an arithmetic logic unit (ALU) and PRMW controller) that is configured to manage operations of the interface circuit 310, the sampler 302, and the main memory device 303 to store and integrate data indicated by the detection signals output from the photodetectors into the histogram data.

In some embodiments, the main memory device 300 may be implemented using volatile memory, such as DRAM, which may require refresh operations to retain data stored therein. The refresh rate of the DRAM cells is controlled by the controller circuit 305. In some embodiments, the refresh rate is selected such that memory refresh operations for all DRAM cells in the array 303 can be completed within the time (or period T) between pulses of a lidar emitter signal. The time between emitter pulses (which defines a laser cycle, or more generally emitter pulse frequency) may be selected or may otherwise correspond to a desired imaging distance range for the lidar system. For example, in some embodiments, the refresh rate may be once per laser cycle or period Tlaser. In some embodiments, the refresh rate may be less than laser rep rate or period Tlaser. In some embodiments, the refresh rate may be equal to the laser rep rate. In some embodiments, the refresh rate may be some integer multiple R of the laser rep rate, where for 1 in R laser cycles, the system may read, modify, and write all bins, and in the other R-1 cycles the system would read, modify, and write bins only if there was a photon present in the bin-time. The value of R can be adjusted by a timing system to save power or as a function of temperature (where more frequent refresh operations may be required at higher temperatures).

Figure 4A:
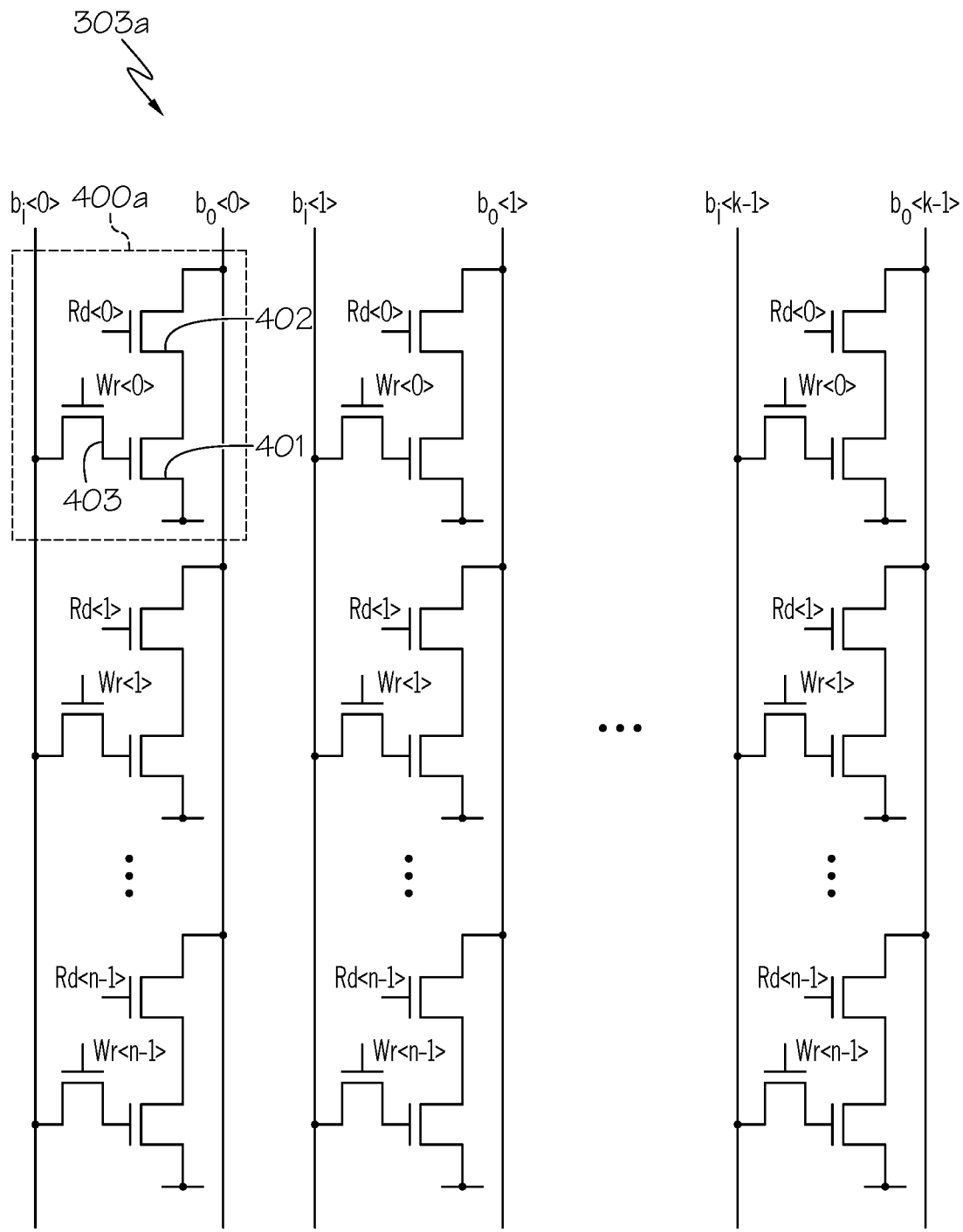
FIG. 4A illustrates an example memory device implementing an n×k bit DRAM array according to some embodiments of the present disclosure using gain cell DRAM, such as 3T DRAM cells.

FIG. 4A illustrates an example memory device implementing an n×k bit DRAM array 303a according to some embodiments of the present disclosure using gain cell DRAM in a 3T configuration. While some embodiments are illustrated herein with reference to NMOS gain cell DRAM configurations, it will be understood that PMOS gain cell DRAM configurations may be similarly used in accordance with the present invention.

As shown in FIG. 4A, each DRAM cell 400a (0 to k−1) of the bins (0 to n−1) includes three transistors 401, 402, 403. First and second transistors 401 and 402 are series-connected to output line or bit line $b_o$<0>: k−1>, and a third transistor 403 is connected between an input line $b_i$<0>: k−1> and a gate of the first transistor 401, which acts as a storage node. A read signal Rd<0: n−1> provides a control signal to the gate of the second transistor 402, and a write signal Wr<0: n−1> provides a control signal to the gate of the third transistor 403. When data is to be read from the cells of a bin (0 to n−1), read signal Rd<0: n−1> is asserted and data is read through the corresponding bit lines $b_o$<0: k−1>. During a read operation, the bitlines $b_o$<0: k−1> are pre-charged to a precharge read voltage Prechargeb. When data is to be written, write signal Wr<0:n−1> is asserted and the data from the input lines $b_i$<0: k−1> are stored in the corresponding DRAM cells 400a. This logic state is maintained through cyclical refresh operations until a new write operation is initiated.

Figure 4B:
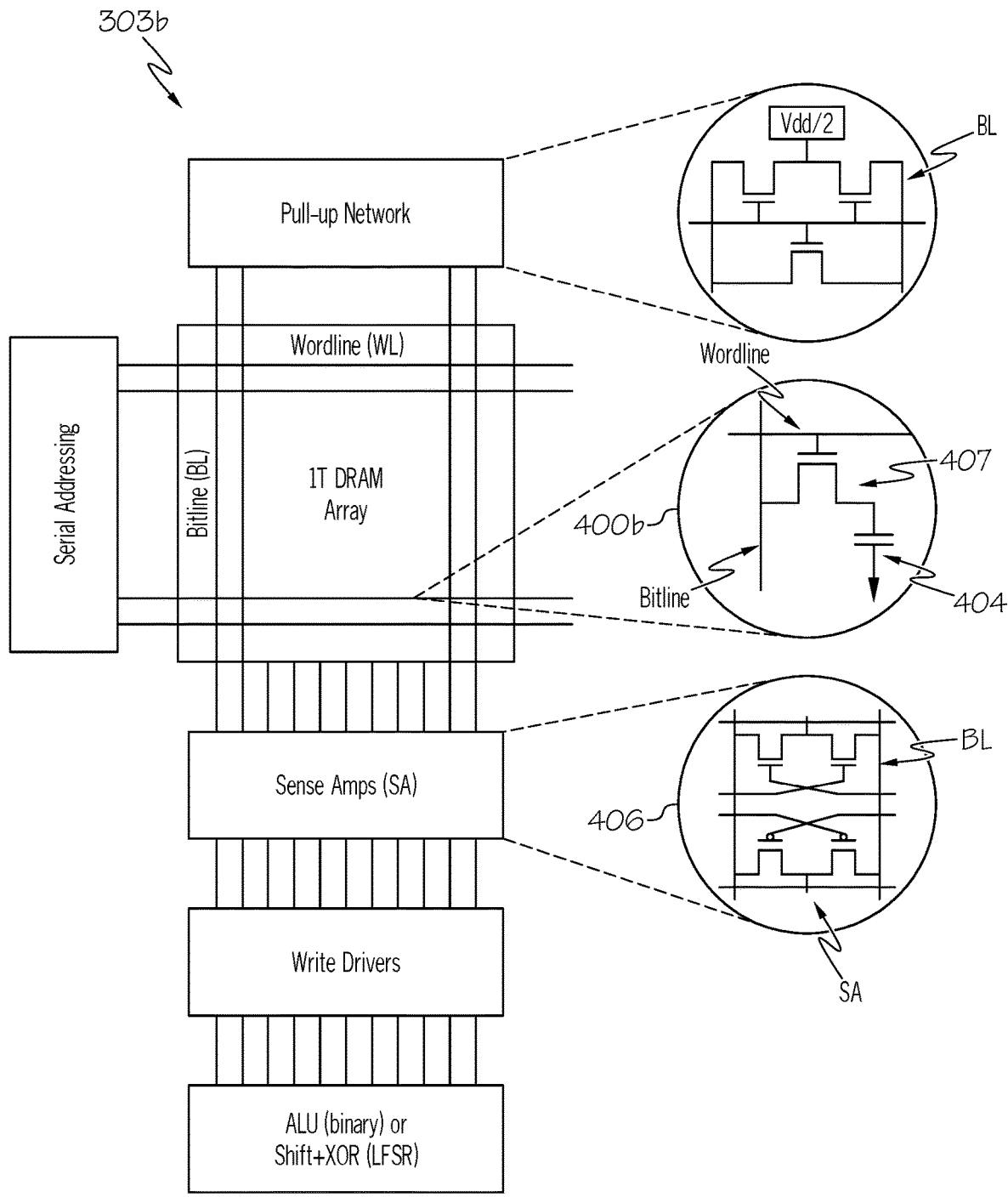
FIG. 4B illustrates an example memory device implementing an n×k bit DRAM array according to some embodiments of the present disclosure using 1T1C DRAM cells.

FIG. 4B illustrates an example memory device implementing an n×k bit DRAM array 303b according to some embodiments of the present disclosure using 1T1C DRAM cells 400b. As shown in FIG. 4B, each DRAM cell (0) to k−1) of the bins (0 to n−1) includes a single transistor 407 (which functions as an access transistor) and a single capacitor 404 (which functions as a storage node), with sense amplifier hardware 406 to increment or refresh the value stored on the capacitor 404.

Figure 9:
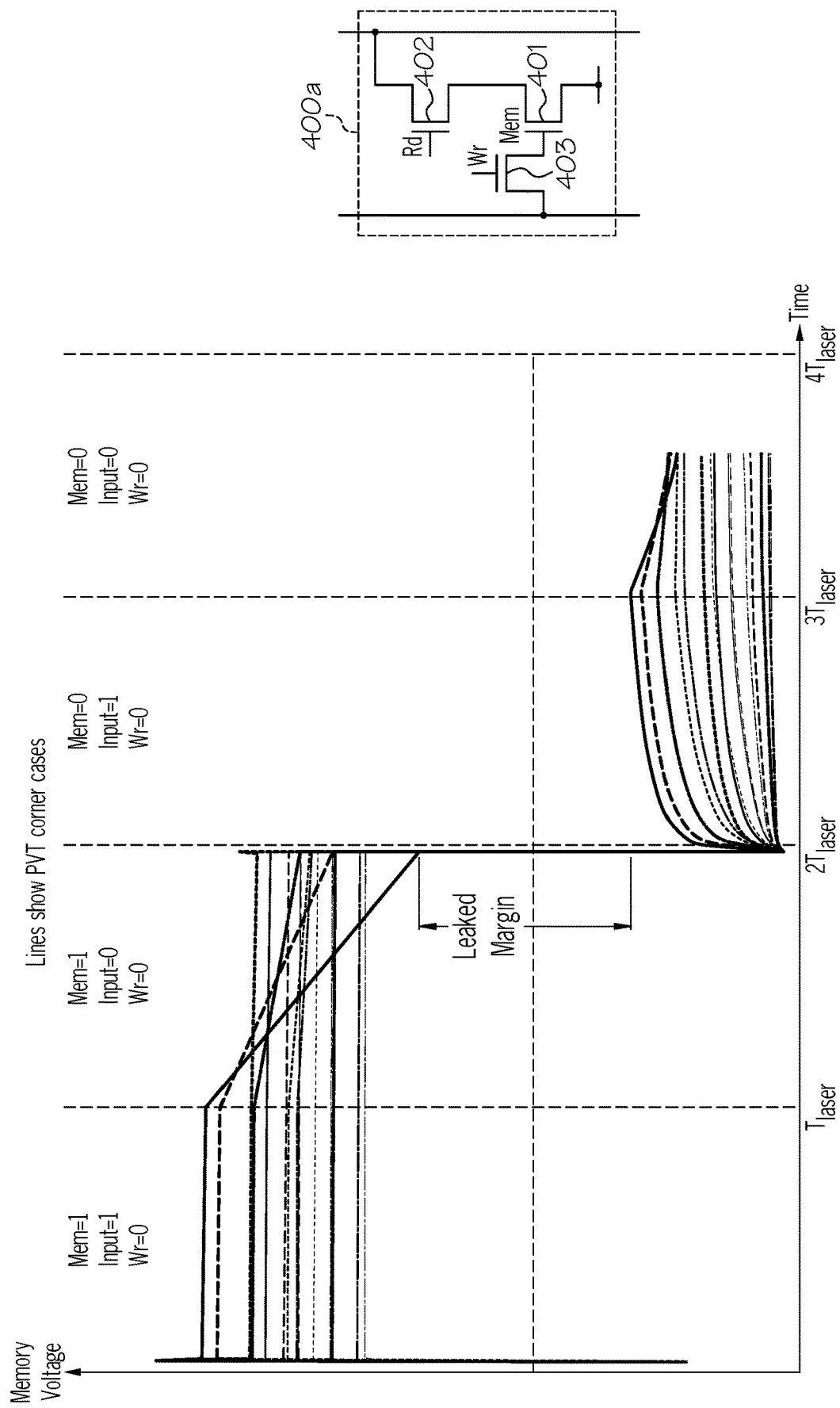
FIG. 9 is a plot illustrating an example simulation of variation of memory cell leakage or retention time with temperature.

Each of the increment and refresh operations for the DRAM-based pixels described herein may include a pre-charge-read-modify-write (PRMW) operation, in which the current contents of a given memory bin 0 to n−1 is read, incremented or refreshed (depending on the presence or absence of detection events), and written back to the respective memory bin. The retention time of the voltage on the storage node can determine a maximum refresh period required to maintain a stored logic state for each DRAM cell 400a, 400b. In some embodiments, the time to complete a refresh operation may be such that each DRAM cell 400a, 400b of the memory array 303 may be refreshed in the time between pulses of the lidar emitter signal: however, it will be understood that the period or frequency of performing the refresh operations is dependent on the leakage (also referred to herein with reference to retention time) of the DRAM cells 400a, 400b, which can vary, for example, with temperature. An example simulation illustrating variation of leakage with temperature is shown in the plot of FIG. 9, where leakage (indicated by the drop in memory voltage) occurs more quickly with increasing temperature (shown by the plotted lines). As such, while described herein primarily with refresh operations performed once per cycle Tlaser of the emitter signal, it will be understood that the refresh operations may be performed more or less frequently in some embodiments (e.g., once every two cycles of the emitter signal (2Tlaser)), or otherwise as needed to meet the leakage requirements of the DRAM cells under the operating conditions.

Figure 5A:
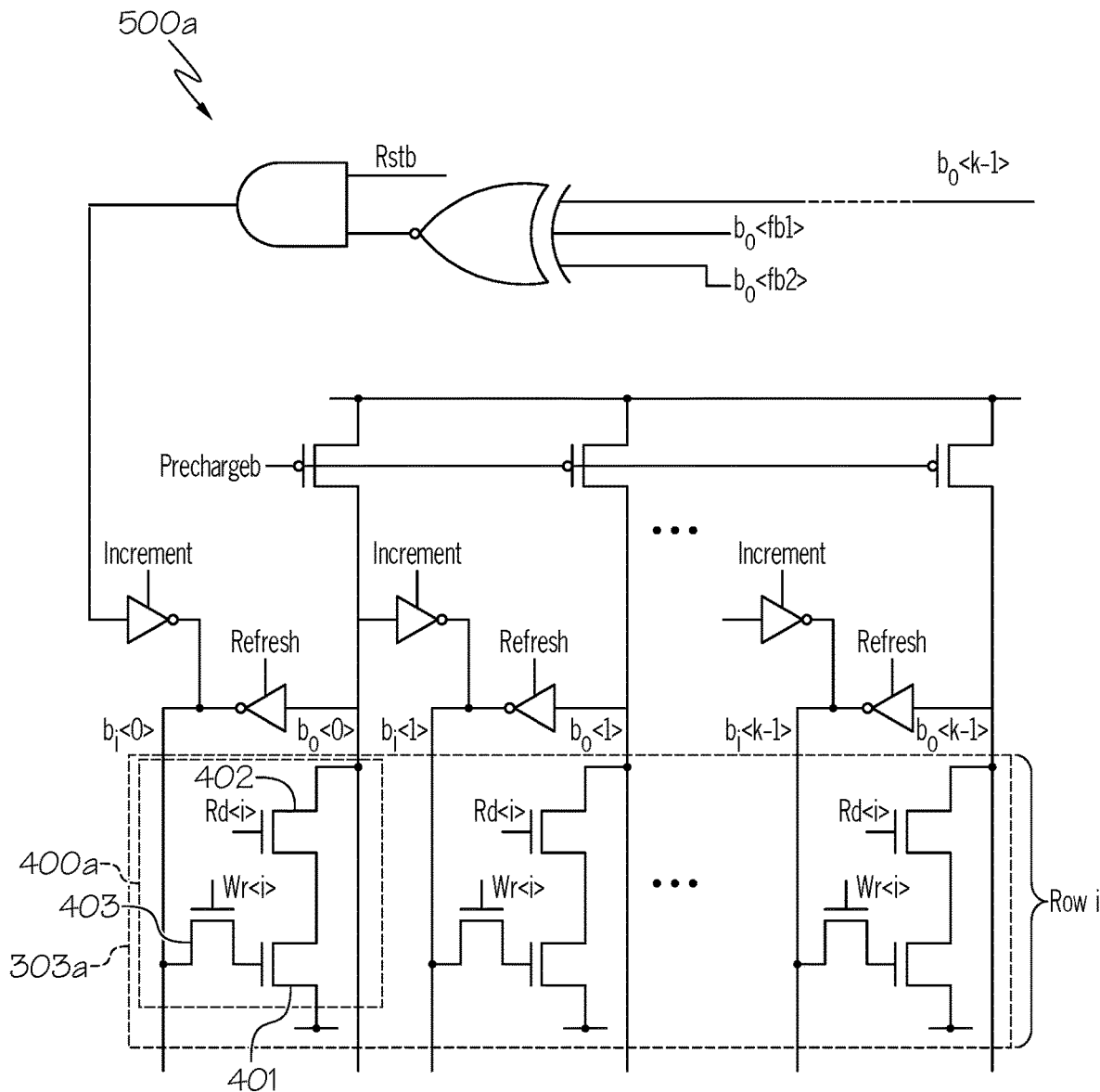
FIG. 5A illustrates an example circuit that is configured to perform increment and refresh operations according to some embodiments of the present disclosure.

FIG. 5A illustrates an example circuit 500a that is configured to perform increment and refresh operations according to some embodiments of the present disclosure. In particular, FIG. 5A illustrates an example embodiment including a k-bit linear feedback shift register (LFSR) PRMW and refresh logic circuit 500a that is configured to perform increment or refresh operations for an example row or bin (shown as Row i) of the DRAM array 303a of FIG. 4A, responsive to the presence or absence of a detection event during a window of activation of a detector pixel in an emitter cycle (e.g., during the time between pulses of an emitter signal). An LFSR is a shift register whose input bit is a linear function of its previous state.

As shown in FIG. 5A, in an increment operation, the signal Increment is asserted responsive to the presence of a detection event (e.g., when the output of a detector pixel is 'high'), and bits stored in the DRAM cell 400a of a memory bin (shown as bin or Row i) are shifted forward by one using an XNOR (or XOR) LFSR loop feedback. In particular, in the circuit of FIG. 5A, an input bit to the leftmost DRAM cell 400a (e.g., the least significant bit of bin i) is driven by the XNOR of the values on one or more of the bit lines $b_o$<fb1>, $b_o$<fb2>, and the value on the most significant bit line $b_o$<k−1>. The value stored in each DRAM cell 400a is thereby shifted to the DRAM cell 400a on its right responsive to the Increment signal. In a refresh operation, the Refresh signal is asserted responsive to the absence of a detection event (e.g., when the output of a detector pixel is 'low'), and the bits stored in each DRAM cell 400a of the memory bin are fed back to its own input. That is, for j=1 to the number of strobe cycles (e.g., cycles or repetitions of a strobe window Strobe<x>), and for bin i=0 to n−1 (in a sequence), if a detection event (e.g., an incident photon) is identified or present in cycle j, then the value stored in the appropriate bin i (corresponding to the time of arrival during the strobe window) is incremented. If a detection event is not identified or absent in cycle j, the value stored in bin i may be either refreshed (for higher refresh rates, i.e., where refresh operations are performed every R (≤1) cycles) or no action may be taken for that cycle j (for lower refresh rates, i.e., where refresh operations are performed every R (>1) cycles).

Figure 5B:
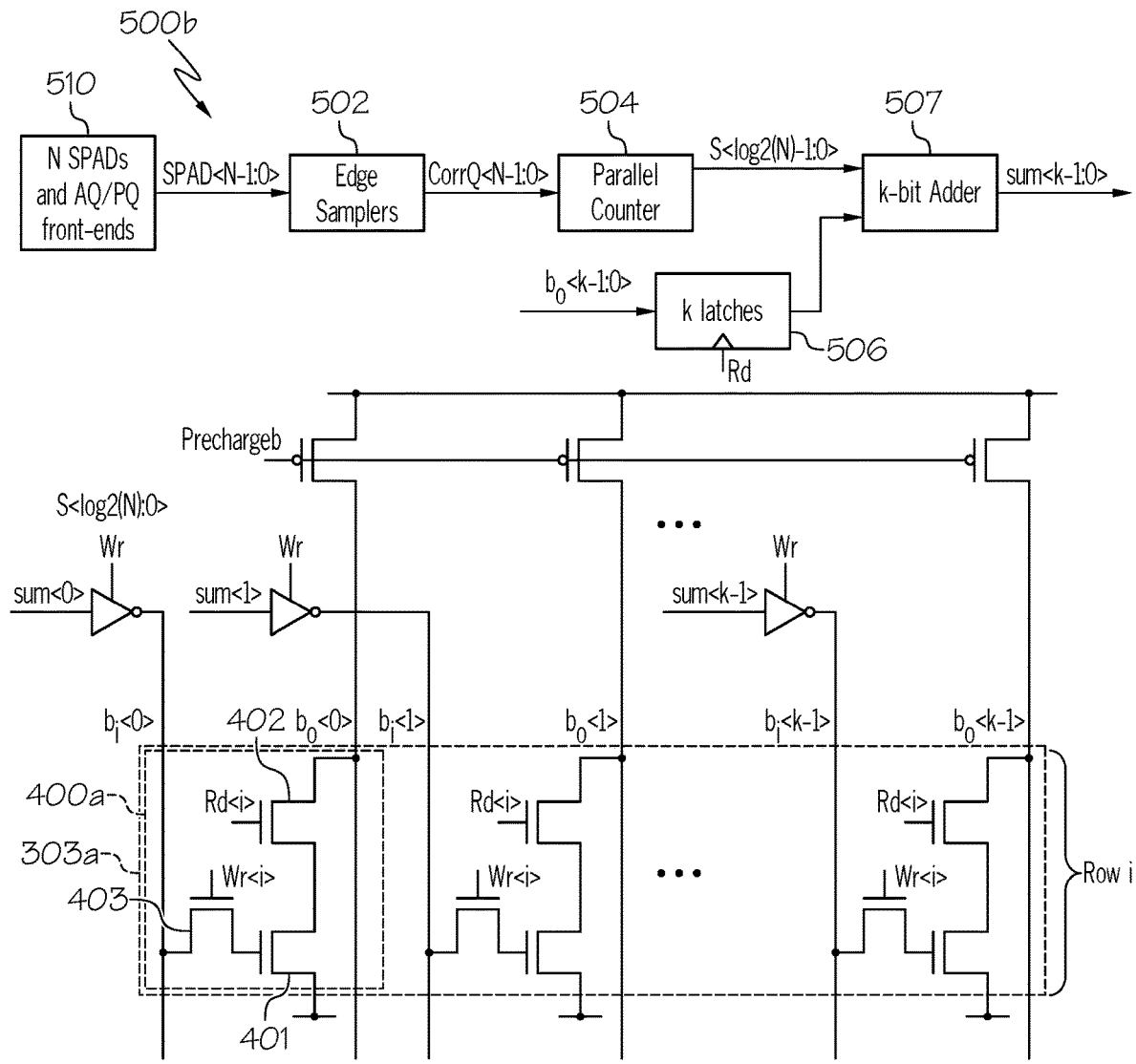
FIG. 5B illustrates an example circuit that is configured to perform increment and refresh operations according to some embodiments of the present disclosure.

FIG. 5B illustrates an example circuit 500b that is configured to perform increment and refresh operations according to some embodiments of the present disclosure. In particular, FIG. 5B illustrates an example embodiment including adder-based pixel that receives inputs from an array of N detector elements 510 (e.g., SPADs). The embodiment of FIG. 5B includes logic implementations of a sampler circuit 502 (shown as Edge Samplers), a parallel counter circuit 504 (shown as Parallel Counter) latch circuits 506 (shown as k latches), and an adder circuit 507 (shown as k-bit Adder), which are configured to perform increment or refresh operations for an example row or bin (shown as Row i) of the DRAM array 303a of FIG. 4A. In the example of FIG. 5B, N SPADs 510 are sampled each bin time for bin i=0 to n−1 in a strobe cycle j. In each bin time, the number of SPADs 510 having fired (indicated by at least one rising edge of SPAD<N−1:0>) is determined by summing the state of CorrQ<N−1:0> (output from the sampler 502) by a parallel counter 504 to produce a sum word S<log 2(N)−1: 0>. This sum is then added to the word read from $b_o$<k−1:0> of bin i of the DRAM array to generate an updated histogram word sum<k−1:0> which is written back into the DRAM word I (i.e., Row i) by the tri-stated write drivers under control of the Wr signal.

Figure 6:
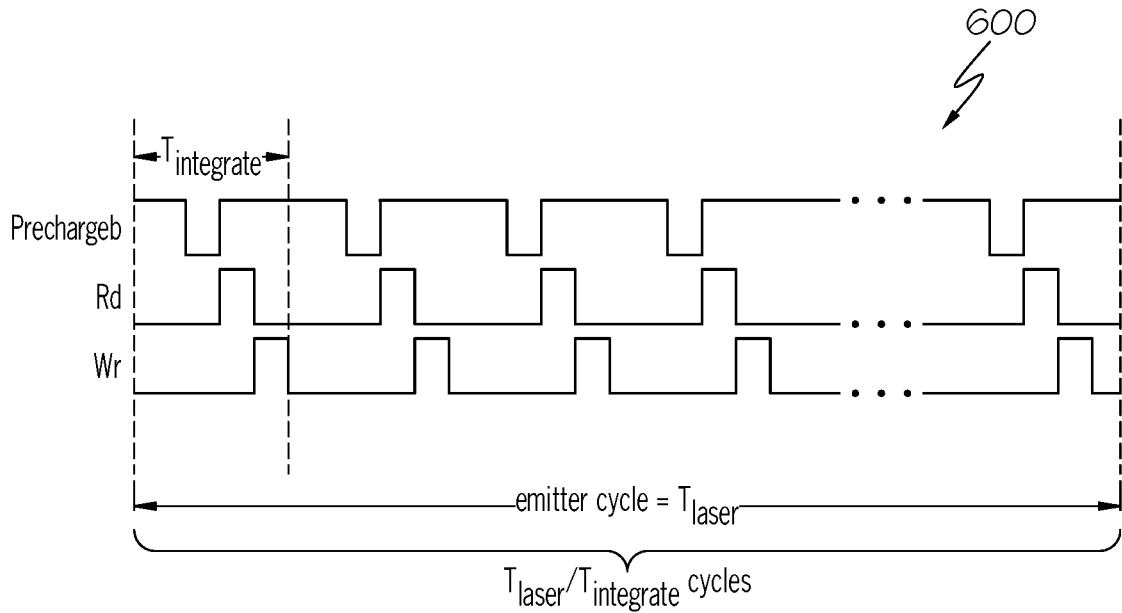
FIG. 6 illustrates an example timing diagram for precharge, read, modify, and write operations to perform increment and refresh operations according to some embodiments of the present disclosure.

FIG. 6 illustrates an example timing diagram 600 for precharge, read, modify (e.g., increment or refresh), and write operations to perform increment and refresh operations according to some embodiments of the present disclosure. As shown in FIG. 6, a precharge signal Prechargeb is applied to output line $b_o$<0: k−1>. Then, read line Rd<0): n−1> is enabled responsive to signal Rd transitioning to a 'high' state, and data is read. Then, write line Wr<0: n–1> is enabled responsive to signal Wr transitioning to a 'high' state, and the cell is either incremented or refreshed. The precharge, read, increment/refresh, and write operations may be completed within sufficient time to prevent leakage of the stored value in each memory cell. In the example of FIG. 6, a number of increment or refresh operations may be performed within an emitter cycle having a period of $T_{laser}$ (e.g., on the order of microseconds or nanoseconds, corresponding to an imaging distance range of about 400 meters), where each precharge, read, increment/refresh, and write operations is completed within a time $T_{integrate}$ (e.g., on the order of nanoseconds). The number of increment or refresh operations may thus be expressed as $T_{laser}/T_{integrate}$. In the example of FIG. 6, for embodiments where a respective strobe window is measured in the time between each pulse of the emitter signal, about hundreds of DRAM cells can be incremented or refreshed for each strobe window.

Figure 7:
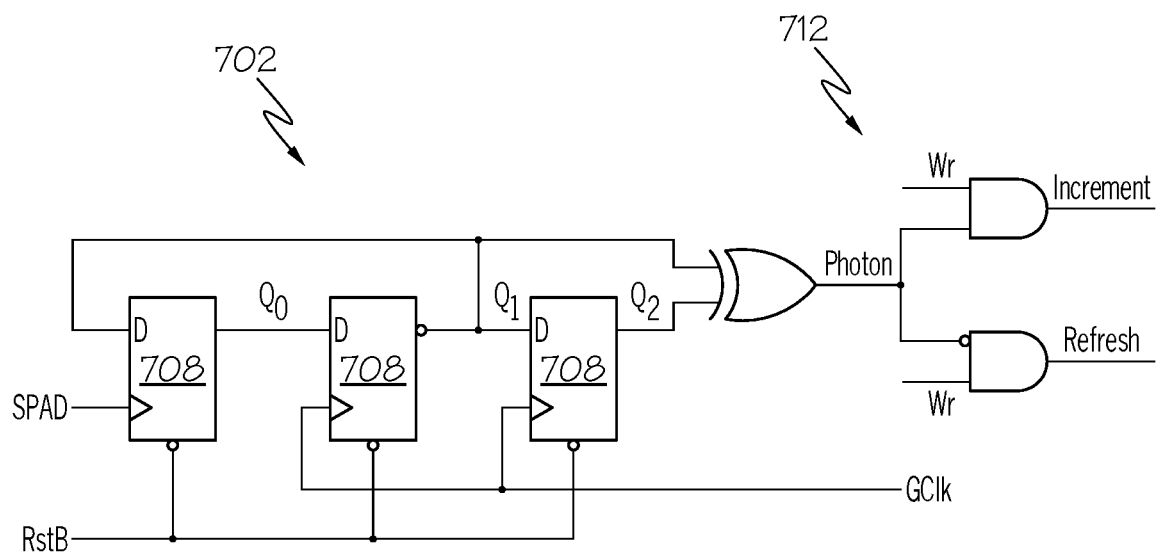
FIG. 7 illustrates an example sampling and increment or refresh circuit according to some embodiments of the present disclosure.

FIG. 7 illustrates an example sampling circuit 702 and increment/refresh circuit 712 according to some embodiments of the present disclosure. As shown in FIG. 7, the sampler circuit 702 includes a configuration of logic circuits 708 (illustrated as D-flip flops) configured to determine if at least one detection event (e.g., indicating detection of a photon based on a detection signal output from a SPAD) has occurred during a clock cycle Gclk. If a detection event has occurred (e.g., the detection signal "Photon" is 'high'), the increment/refresh circuit 712 outputs the Increment signal responsive to signal Wr (shown in FIG. 6) transitioning to a 'high' state, an LFSR circuit (e.g., the circuit 500a shown in FIG. 5A) is clocked onwards to perform the increment operation. If no detection event has occurred (e.g., the detection signal "Photon" is 'low'), the increment/refresh circuit 712 outputs the Refresh signal responsive to signal Wr transitioning to a 'high' state, and the LFSR circuit is clocked backwards to perform the refresh operation.

Figure 8:
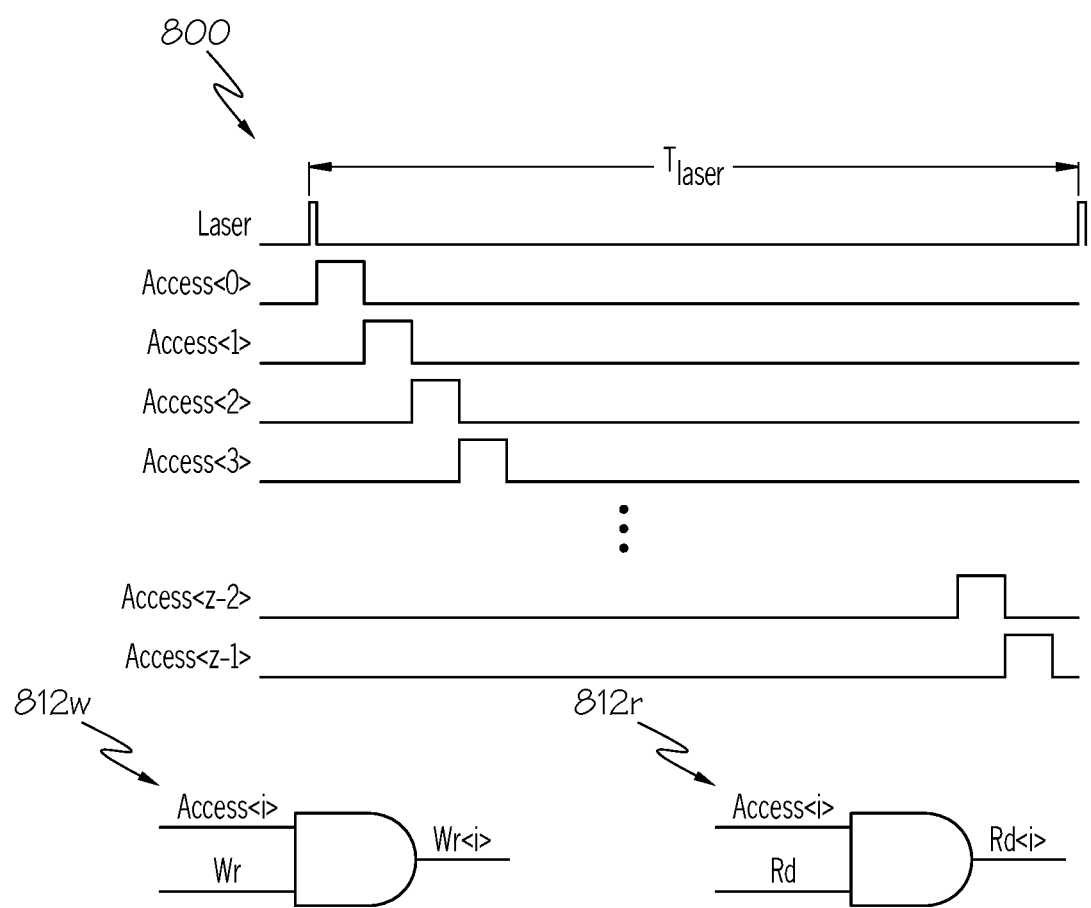
FIG. 8 illustrates an example timing diagram for generating signals for asserting or enabling write signals and read signals to perform increment and refresh operations according to some embodiments of the present disclosure.

FIG. 8 illustrates an example timing diagram 800 for generating signals for asserting or enabling write signal Wr<i> and read signal Rd<i> (implemented by logic circuits 812w and 812r, respectively) for (bins i=0 to n–1) to perform increment and refresh operations according to some embodiments of the present disclosure. As shown in the example of FIG. 8, for an array of single-photon detectors, the DRAM cells storing the respective bits of each memory bin i can be accessed and either incremented or refreshed (illustrated as "Access<0:z–1>" operations in FIG. 8) during the time (or period $T_{laser}$) between pulses of the emitter signal (Laser). That is, the number of bins (and bits per bin) of an array that can be refreshed in a cycle may be limited by the time between pulses of the emitter signal. Due to its deterministic operation (where each current value is determined by its previous state), in some embodiments an LFSR circuit (such as the circuit 500a shown in FIG. 5A) may be used to reduce or minimize the time needed for each increment/refresh operation. Reducing the time required for each increment/refresh operation may allow more increment/refresh operations to be performed (e.g., within the time between pulses of the emitter signal), thus increasing the total number of DRAM bits that can be stored (assuming sufficient surface area is available for the DRAM array).

Still referring to the example of FIG. 8, each bin is accessed serially or sequentially (i.e., one bin at a time), but not necessarily in any particular order. In some embodiments, the increment or refresh operations can be performed sequentially for each row/bin 0 to n–1, with readout in a rolling-shutter scheme. In the example of FIG. 8, there may be z access operations (Access<0> to Access<z–1>) performed between pulses of an emitter signal Laser (which, as noted in the above example, may have a period of $T_{laser}$). Each access operation Access<i> may require a time duration of $T_{integrate}$ ($T_{laser}/z$ access operations), and may include the precharge, read, increment/refresh, and write operations discussed above with reference to FIG. 6. In some embodiments (e.g., using the LFSR 500a shown in FIG. 5A), the duration for each access operation Access<i> may be independent of the bit depth, as the read and write operations may be performed in parallel. In other embodiments (e.g., using a binary ALU with a series carry chain), the duration for each access operation Access<i> may vary based on the bit depth (the duration may increase with the number of bits k per bin n, e.g., due to the greater number of gates to settle).

As such, some embodiments described herein may allow for performing increment/refresh operations on up to $T_{laser}/T_{integrate}$ bins per emitter cycle, based on leakage or retention time similar to the period $T_{laser}$ (e.g., for a 400 m laser system) for each memory cell over a temperature range of about –40 to about +125 degrees Celsius, providing more than sufficient resolution for ToF estimation. However, as noted above, if the leakage or retention time of the memory cells is greater, the frequency of the refresh operations can be reduced (e.g., for memory cells with a leakage or retention time of 2.6 μs, 334 bins may be refreshed once every 2 laser cycles, or 668 bins may be used). That is, the retention time may be highly process dependent, and if the retention time is longer than the laser period $T_{laser}$, refresh operations may be performed less frequently, to save power.

In some embodiments, the refresh operations described herein may be performed once per laser cycle, e.g., as the retention times of the memory cells may be similar to the period Tlaser, even at higher temperatures. For example, a refresh operation may be implemented by performing an increment operation (e.g., once per laser cycle) and then subtracting the known number of laser cycles from the LFSR code, e.g., at the end of an exposure. The laser cycle or period Tlaser may selected to correspond to a maximum or other desired LIDAR imaging distance range.

Some advantages of embodiments of the present disclosure may include more compact layout (e.g., by using only a single type of transistor (e.g., NMOS transistors, without N-wells)), and lower bitline capacitance (e.g., one drain diffusion per cell, as only one transistor of each cell may be coupled to the bit line), which can allow for lower power requirements and faster PRMW cycles (e.g., half the number of access lines to DRAM as compared to SRAM, as SRAM may require a pair of bit lines). Also, smaller pixel implementations (e.g., having one or more dimensions of less than 10 mm) may be possible with fewer bins (e.g., 4 bins) for iToF with high bit depth (e.g., 18 bits), for example, for short range applications (e.g., indoor applications with a distance range of about 3 m or less). Such indoor or other short range applications may need to complete increment/refresh operations as described herein in a shorter time duration and/or at higher frequency due to the shorter ranging distance (and thus, smaller period of the emitter signal). Some embodiments may allow for short range direct ToF pixels with a small pixel pitch in the same area as an iToF pixel. Also, the lower drive capacitance of Rd and Wr at digital Vdd may allow for lower power, higher frequency (e.g., on the order of hundreds of MHz) global drive of the bin clocks (Gclk). For example, higher frequency global clocks Gclk may be required for indoor short range ToF, but may need to keep loading of those clocks Gclk low to achieve such frequencies over a large array at low power consumption. DRAM may provide this capability, as only a single transistor is driven by Rd or Wr. Power consumption requirements may be lower for indoor ToF systems, which are often battery powered and portable.

While some embodiments of the present disclosure may require a custom (rather than existing fab-supported) gain cell DRAM layout, the use of a single transistor type (e.g., NMOS only) may allow for more compact implementations (e.g., due to the use of absence of PMOS transistors) in comparison to SRAM cell layouts. Embodiments of the present disclosure may utilize a sequential or rolling shutter-type readout (where one row or bin is read out at a time), such that increment or refresh operations can continue during readout operations that may require a greater time duration (e.g., on the order of milliseconds) than the retention time of the storage node. The refresh rate in embodiments described herein is selected to be sufficient to ensure that the DRAM cells do not leak, and may be dependent on operating conditions (e.g., operating temperatures). As noted above, in embodiments where refresh operations are performed once per emitter cycle, a refresh time of up to about 2.667 us may be sufficient for operating temperatures of up to about 125° C. Also, embodiments described herein may involve off-chip decoding of the LFSR code into binary (e.g., using lookup tables and associated software operations), which may require overhead in terms of additional power and/or device area.

Further embodiments of memory structures, such as DRAM structures, that may be used in memory devices as described herein may include, but are not limited to, the following. In some embodiments, optical-electrical isolation structures between detector elements (e.g., SPADs) are implemented as deep-trench isolation. In some embodiments, the memory structures are located on a separate wafer from the detector elements of a detector array, then the detector array on and the memory structures on the separate wafer are electrically interconnected, e.g., using in-pixel bump bonds.

Figure 10:
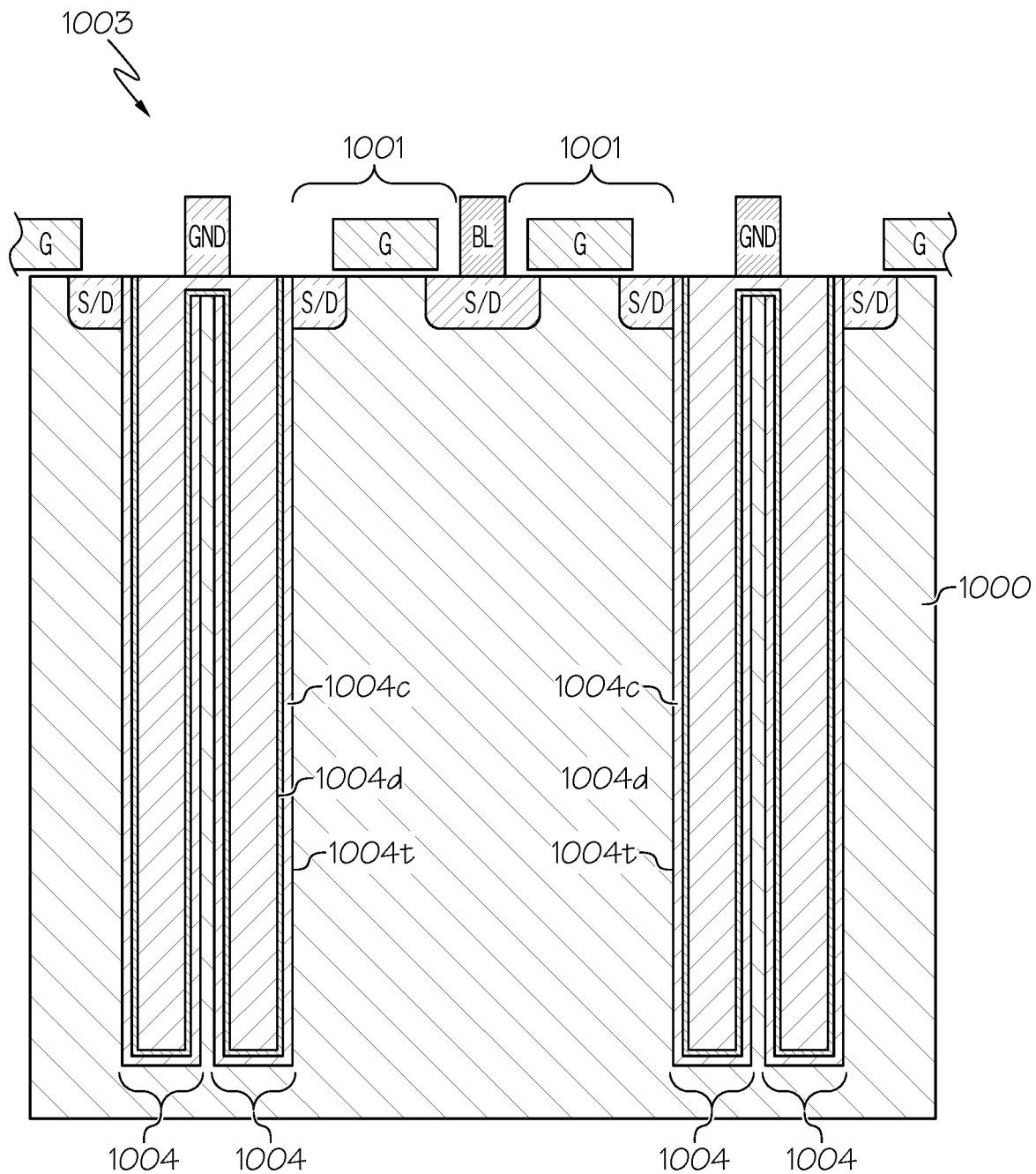
FIG. 10 is a cross-sectional view illustrating memory structures including trench capacitors according to some embodiments of the present disclosure.

In some embodiments, the memory structures are implemented as trench capacitors, as shown for example in FIG. 10. In particular, FIG. 10 illustrates implementation of an n×k DRAM array 1003 including access transistors 1001 and storage capacitor structures 1004 in a substrate 1000. The storage capacitor structures 1004 include conductive layers 1004c (e.g., polysilicon) and dielectric layers 1004d in trenches 1004d between access transistors 1001. In some embodiments, the DRAM structures are formed by creating trench capacitors and ensuring those capacitors are sufficiently optically isolated from their surroundings, for example, by depositing a coating layer which is sufficiently opaque on the sides of the DRAM structures.

In some embodiments, the memory structures are formed on the detector wafer, such that the memory device and the detector elements are native to a same wafer or substrate. In some embodiments, the DRAM structures also form an optical and/or electrical barrier (e.g., when implemented as trench capacitors) between SPAD structures, thus reducing the area of the die by using the DRAM structures both as memory structures and as optical barriers to photons, such as those generate by hot-carrier recombination, thus potentially reducing optical cross-talk effects. Other variations of gain cell DRAM structures that may be used in accordance with embodiments of the present disclosure may include those described in the publication to P. Meinerzhagen, et al., "Gain-Cell Embedded DRAMs for Low-Power VLSI Systems-on-Chip," Basel, Switzerland: Springer, 2018, the disclosure of which is incorporated by reference herein.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments may be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

The invention claimed is:

1. A Light Detection and Ranging (LIDAR) detector circuit, comprising:
   a memory device comprising a non-transitory storage medium that is configured to store histogram data in respective memory bins; and
   at least one control circuit configured to:
   receive detection signals from one or more photodetector elements;
   execute a first memory operation to update the histogram data in the respective memory bins responsive to the detection signals indicating a presence of detection events during a portion of time between pulses of an emitter signal output from a LIDAR emitter element, wherein the first memory operation comprises an increment operation; and
   execute a second memory operation to update the histogram data in the respective memory bins responsive to the detection signals indicating an absence of the detection events during the portion of the time between the pulses of the emitter signal, wherein the second memory operation comprises a refresh operation, and
   wherein the increment operation or the refresh operation to update the histogram data stored in the respective memory bins of the memory device is completed within the time between the pulses of the emitter signal.

2. The LIDAR detector circuit of claim 1, wherein the at least one control circuit is configured to execute the refresh operation at a frequency that is greater than or less than a frequency of the pulses of the emitter signal, and wherein the frequency of the refresh operation is temperature-dependent.

3. The LIDAR detector circuit of claim 1, wherein the at least one control circuit comprises a logic-based counter circuit that is configured to perform the increment operation or the refresh operation.

4. The LIDAR detector circuit of claim 3, wherein the counter circuit comprises a plurality of serially-connected adder circuits.

5. The LIDAR detector circuit of claim 3, wherein the counter circuit comprises a linear feedback shift register that is configured to execute the increment operation by shifting bits stored in the respective memory bins forward using a linear feedback loop.

6. The LIDAR detector circuit of claim 5, wherein the linear feedback shift register is configured to execute the refresh operation by feeding bits stored in the respective memory bins back to at least one input thereof.

7. The LIDAR detector circuit of claim 1, wherein the increment or refresh operations are performed sequentially for the respective memory bins.

8. The LIDAR detector circuit of claim 7, wherein the memory device is a memory array comprising respective rows or columns of dynamic random access memory (DRAM) cells that define the respective memory bins, and wherein at least one control circuit is further configured to output a readout signal responsive to a read signal that is sequentially applied to the respective rows or columns.

9. The LIDAR detector circuit of claim 8, wherein the memory device and the one or more photodetector elements comprise the DRAM cells and a plurality of the photodetector elements that are native to a same wafer, or are provided on respective wafers and electrically interconnected.

10. The LIDAR detector circuit of claim 8, wherein the DRAM cells are provided in respective trenches between the photodetector elements and define optical and/or electrical barriers between adjacent ones of the photodetector elements.

11. The LIDAR detector circuit of claim 8, wherein the readout signal comprises a count signal and/or a time integration signal, and wherein the at least one control circuit is configured to calculate an estimated time of arrival of photons incident on the photodetector elements based on the readout signal.

12. The LIDAR detector circuit of claim 1, wherein the portion of the time between the pulses of the emitter signal corresponds to a respective distance subrange, and wherein the respective memory bins comprise histogram data corresponding to the respective distance subrange.

13. The LIDAR detector circuit of claim 12, wherein the photodetector elements comprise single-photon avalanche detectors (SPADs), and wherein the histogram data comprises photon counts indicated by the detection signals corresponding to the respective distance subrange.

14. The LIDAR detector circuit of claim 1, wherein the at least one control circuit is configured to transmit respective strobe signals that activate the one or more photodetector elements for respective detection windows that are differently delayed between the pulses of the emitter signal.

15. The LIDAR detector circuit of claim 14, wherein the respective detection windows correspond to respective distance subranges, and wherein the at least one control circuit is configured to transmit the respective strobe signals to activate the one or more photodetector elements to sequentially cycle through the respective distance subranges.

16. A Light Detection and Ranging (LIDAR) detector circuit, comprising:
   one or more photodetector elements defining a LIDAR detector pixel;
   a memory device comprising a non-transitory storage medium that is configured to store data in respective memory bins, wherein the memory bins comprise dynamic random access memory (DRAM) cells; and
   at least one processor circuit configured to receive detection signals from the one or more photodetector elements, identify an absence of detection events indicated by the detection signals during a portion of time between pulses of an emitter signal output from a LIDAR emitter element, and execute a memory operation to update the data in the respective memory bins responsive to identification of the absence of the detection events,
   wherein the DRAM cells are provided in respective trenches between the photodetector elements and define optical and/or electrical barriers between adjacent ones of the photodetector elements.

17. The LIDAR detector circuit of claim 16, wherein the memory operation is a refresh operation, and wherein the at least one processor circuit is further configured to identify a presence of the detection events indicated by the detection signals during the portion of the time between the pulses of the emitter signal, and execute an increment operation to update the data in the respective memory bins responsive to identification of the presence of the detection events.

18. The LIDAR detector circuit of claim 17, wherein the at least one processor circuit is configured to execute the refresh operation at a frequency that is greater than or less than a frequency of the pulses of the emitter signal, optionally and wherein the frequency of the refresh operation is temperature-dependent.

19. The LIDAR detector circuit of claim 18, wherein the at least one processor circuit comprises a linear feedback shift register that is configured to execute the increment operation by shifting bits stored in the respective memory bins forward using a linear feedback loop, and is configured to execute the refresh operation by feeding bits stored in the respective memory bins back to at least one input thereof.

20. The LIDAR detector circuit of claim 17, wherein the increment operation or the refresh operation to update the data stored in the respective memory bins of the memory device is completed within the time between the pulses of the emitter signal.

21. The LIDAR detector circuit of claim 17, wherein the portion of the time between the pulses of the emitter signal correspond to a respective distance subrange, the respective memory bins comprise histogram data corresponding to the respective distance subrange, the histogram data comprises photon counts indicated by the detection signals, and the memory device comprises dynamic random access memory (DRAM) cells that define the respective memory bins.

22. A method of operating a Light Detection and Ranging (LIDAR) detector circuit, the method comprising:
   receiving detection signals from one or more photodetector elements;
   identifying a presence or an absence of detection events indicated by the detection signals during a portion of time between pulses of an emitter signal output from a LIDAR emitter element; and
   executing one of a first memory operation or a second memory operation to update histogram data stored in respective memory bins of a memory device comprising a non-transitory storage medium responsive to identification of the presence or the absence of the detection events, respectively,
   wherein the first memory operation comprises an increment operation, the second memory operation comprises a refresh operation, and the executing the one of the increment operation or the refresh operation to update the histogram data stored in the respective memory bins of the memory device is completed within the time between the pulses of the emitter signal.

23. The method of claim 22, wherein the executing the refresh operation comprises executing the refresh operation at a frequency that is greater than or less than a frequency of the pulses of the emitter signal, and wherein the frequency of the refresh operation is temperature-dependent.

24. The method of claim 22, wherein the executing the increment operation comprises shifting bits stored in the respective memory bins forward using a linear feedback loop of a linear feedback shift register.

25. The method of claim 24, wherein the executing the refresh operation comprises feeding bits stored in the respective memory bins back to at least one input of the linear feedback shift register.

26. A LIDAR system comprising the detector circuit of claim 1, wherein the LIDAR system is configured to be coupled to an autonomous vehicle such that the LIDAR emitter element and the one or more photodetector elements are oriented relative to an intended direction of travel of the autonomous vehicle.

* * * * *